(12) United States Patent
Knapp

(10) Patent No.: US 10,162,969 B2
(45) Date of Patent: Dec. 25, 2018

(54) DYNAMIC QUANTIFICATION OF CYBER-SECURITY RISKS IN A CONTROL SYSTEM

(71) Applicant: HONEYWELL INTERNATIONAL INC., Morristown, NJ (US)

(72) Inventor: Eric D. Knapp, Milton, NH (US)

(73) Assignee: Honeywell International Inc., Morris Plains, NJ (US)

(*) Notice: Subject to any disclaimer, the term of this patent is extended or adjusted under 35 U.S.C. 154(b) by 674 days.

(21) Appl. No.: 14/482,888

(22) Filed: Sep. 10, 2014

(65) Prior Publication Data
US 2016/0070915 A1   Mar. 10, 2016

(51) Int. Cl.
*G06F 21/57* (2013.01)
*H04L 29/06* (2006.01)
*G06F 21/55* (2013.01)

(52) U.S. Cl.
CPC ......... *G06F 21/577* (2013.01); *G06F 21/552* (2013.01); *H04L 63/1433* (2013.01); *G06F 2221/034* (2013.01); *G06F 2221/2115* (2013.01); *G06F 2221/2145* (2013.01)

(58) Field of Classification Search
USPC ....................................... 726/22, 23, 24, 25
See application file for complete search history.

(56) References Cited

U.S. PATENT DOCUMENTS

| 7,594,270 B2 * | 9/2009 | Church | G06F 21/552 726/23 |
| 8,601,170 B1 * | 12/2013 | Marr | G06F 21/572 710/15 |

(Continued)

FOREIGN PATENT DOCUMENTS

| KR | 20110087078 | 8/2011 |
| KR | 20110130203 | 12/2011 |
| WO | 2012157471 | 11/2012 |

OTHER PUBLICATIONS

Eric D. Knapp, et al., "Industrial Network Security", Second Edition, Elsevier, 2015.

*Primary Examiner* — Lisa C Lewis
*Assistant Examiner* — Thanh T Le

(57) ABSTRACT

A system and method for analyzing cyber-security risk inter-dependencies in a control system having networked devices. The system includes a central server that has a processor and a memory device in communication with the processor. The memory device stores inter-device dependencies and quantified individual risks for each of the networked devices. The memory device also stores a dynamic quantification of risk (DQR) program. The central server is programmed to implement the DQR program. Responsive to observed cyber behavior, the central server changes one or more of the quantified individual risks to generate at least one modified quantified individual risk. The inter-device dependencies for a first of the networked devices and the quantified individual risk for at least one other of the networked devices reflecting the modified quantified individual risk are used to dynamically modify the quantified individual risk for the first device to generate an inter-device modified quantified individual risk.

9 Claims, 8 Drawing Sheets

(56) References Cited

U.S. PATENT DOCUMENTS

| | | | |
|---|---|---|---|
| 8,984,643 B1* | 3/2015 | Krisher | H04L 63/1433 726/25 |
| 2007/0094491 A1 | 4/2007 | Teo et al. | |
| 2008/0175266 A1* | 7/2008 | Alperovitch | G06F 21/554 370/465 |
| 2011/0039237 A1* | 2/2011 | Skare | G05B 23/0267 434/118 |
| 2011/0040399 A1 | 2/2011 | Lu | |
| 2012/0180133 A1 | 7/2012 | Al-Harbi et al. | |
| 2013/0031634 A1* | 1/2013 | McClure | G06F 21/552 726/25 |
| 2013/0117812 A1* | 5/2013 | Ponchel | G06F 21/552 726/1 |
| 2013/0132149 A1* | 5/2013 | Wei | G05B 23/0281 705/7.28 |
| 2013/0151849 A1* | 6/2013 | Graham | H04L 9/32 713/164 |
| 2013/0152198 A1 | 6/2013 | Akiyama et al. | |
| 2013/0227697 A1* | 8/2013 | Zandani | H04L 63/1433 726/25 |
| 2014/0032172 A1* | 1/2014 | McCarthy | G05B 23/0227 702/183 |
| 2014/0130033 A1* | 5/2014 | Alls | G06F 8/65 717/172 |
| 2014/0137257 A1* | 5/2014 | Martinez | H04L 63/1433 726/25 |
| 2014/0173738 A1* | 6/2014 | Condry | G06F 21/577 726/25 |
| 2014/0337086 A1* | 11/2014 | Asenjo | G06Q 10/0635 705/7.28 |
| 2014/0359777 A1* | 12/2014 | Lam | G06F 21/577 726/25 |
| 2015/0205966 A1* | 7/2015 | Chowdhury | G06F 21/577 726/23 |
| 2015/0237065 A1* | 8/2015 | Roytman | H04L 63/1433 726/25 |
| 2015/0278729 A1* | 10/2015 | Hu | G06Q 10/0635 705/7.28 |
| 2016/0050225 A1* | 2/2016 | Carpenter | H04L 63/1433 726/25 |
| 2016/0099963 A1* | 4/2016 | Mahaffey | H04L 63/0227 726/25 |
| 2016/0224048 A1* | 8/2016 | Rooyakkers | G05F 1/66 |
| 2016/0241580 A1* | 8/2016 | Watters | H04L 63/20 |
| 2016/0241581 A1* | 8/2016 | Watters | H04L 63/1433 |
| 2016/0248794 A1* | 8/2016 | Cam | H04L 63/1433 |
| 2017/0187745 A1* | 6/2017 | Ng | H04L 63/20 |
| 2018/0089416 A1* | 3/2018 | Rooyakkers | H04L 9/083 |

* cited by examiner

DYNAMIC QUANTIFICATION OF CYBER-SECURITY RISKS IN A CONTROL SYSTEM

FIELD

Disclosed embodiments generally relate to cyber-security for networks associated with control systems, and more specifically relate to dynamic quantification of cyber-security risks in a control system.

BACKGROUND

Computer systems are used in performing a variety of different tasks. For example, an industrial network of computer systems and equipment are used in controlling and/or monitoring industrial systems termed industrial control systems (ICS). Such ICS can be used in connection with manufacturing, power generation, energy distribution, waste handling, transportation, telecommunications, and water treatment. The ICS may be connected and accessible via other networks, both directly and indirectly, including a corporate network and the Internet.

The industrial network may thus be susceptible to both internal and external cyber-attacks. As a preventive measure from external cyber-attacks, firewalls or other security measures may be taken to separate the industrial network from the other networks.

In an ICS, cyber-security is of increasing concern, and it is difficult to quickly determine the potential sources of risk to the whole system. Modern ICS generally contain a mix of devices/equipment including WINDOWS servers and workstations, switches, routers, firewalls, safety systems, proprietary real-time controllers and field devices. Often such devices/equipment is a mixture from different vendors.

Moreover, ICS operators may not have a complete understanding or inventory of all the devices/equipment running in the ICS. Unaddressed security vulnerabilities in any of the devices/equipment can cause system failures including disrupting production or causing unsafe conditions. Such system failures may be the result of a malicious attack, a disgruntled employee, a virus or just the result of a mistake coupled with a lack of cyber security measures. Even stand-alone devices/equipment can be vulnerable, such as by viruses which can be introduced via Universal Serial Bus (USB) memory "sticks".

SUMMARY

This Summary is provided to present a summary to briefly indicate the nature and substance of this Disclosure. It is submitted with the understanding that it will not be used to interpret or limit the scope or meaning of the claims.

Disclosed embodiments recognize that cyber security risks in a complex control system having a plurality of network connected devices or equipment (hereafter "networked devices") are constantly changing and in a dynamic state. The cyber security risks are inter-device dependent at least partially based on the interconnectivity between the networked devices. Accordingly, there is a recognized need for a cyber-security risk analysis system and algorithm that dynamically analyzes cyber-security risks using inter-device dependencies based on the interconnectivity between the networked devices and the frequency of occurrence of an individual cyber-security risk in order to guide a user to mitigate the vulnerabilities.

As used herein the term a cyber "security risk" in a network, generally refers to any cyber security control that is deficient, misconfigured, or vulnerable. Security risk includes, but is not limited to, missing patches, out-of-date antivirus software, excessive security privilege, inappropriate use, and unauthorized changes. As used herein "deficient" is defined as there being either no control in place (missing) or the control that is in place is insufficient for the task, "misconfigured" is defined as appropriate control being in place but is configured in a way that renders it partially or totally ineffective, and "vulnerable" is defined as when an appropriate control is in place, but it is out-of-date or unpatched, causing it to be susceptible to cyber-attacks.

Disclosed embodiments comprise a method for quantifying cyber-security risks in a control system including several (and generally a large number of) networked devices. The method includes providing a processor and a memory device storing inter-device dependencies based on an interconnectivity between the networked devices. A vulnerability database is stored on the memory device and includes quantified individual cyber risks (quantified individual risks) for each of the plurality of networked devices. The memory device also stores a dynamic quantification of risk (DQR) algorithm.

The processor runs the DQR algorithm causing the processor to implement receiving observed cyber behavior for the networked devices during operation of the network. Responsive to the observed cyber behavior, one or more of the quantified individual risks are changed to generate at least one modified quantified individual risk. The inter-device dependencies for a first of the plurality of networked devices (first device) and the quantified individual risk for at least one other of the plurality of networked devices reflecting the modified quantified individual risk are used to dynamically modify the quantified individual risk for the first device to generate an inter-device modified quantified individual risk.

One disclosed embodiment comprises a cyber-security risk analysis system for analyzing cyber-security risks in a control system including several networked devices. The system includes a central server that has a processor and a memory device in communication with the processor. The memory device stores inter-device dependencies based on an interconnectivity between the networked devices and a vulnerability database that includes quantified individual cyber risks (quantified individual risks) for each of the networked devices. The memory device also stores a dynamic quantification of risk (DQR) program. The central server is programmed to implement the DQR program.

The central server receives observed cyber behavior for the networked devices during operation of the network. Responsive to the observed cyber behavior, the central server changes one or more of the quantified individual risks to generate at least one modified quantified individual risk. The inter-device dependencies for a first of the networked devices (first device) and the quantified individual risk for at least one other of the networked devices reflecting the modified quantified individual risk are used to dynamically modify the quantified individual risk for the first device to generate an inter-device modified quantified individual risk.

DETAILED DESCRIPTION

Figure 1:
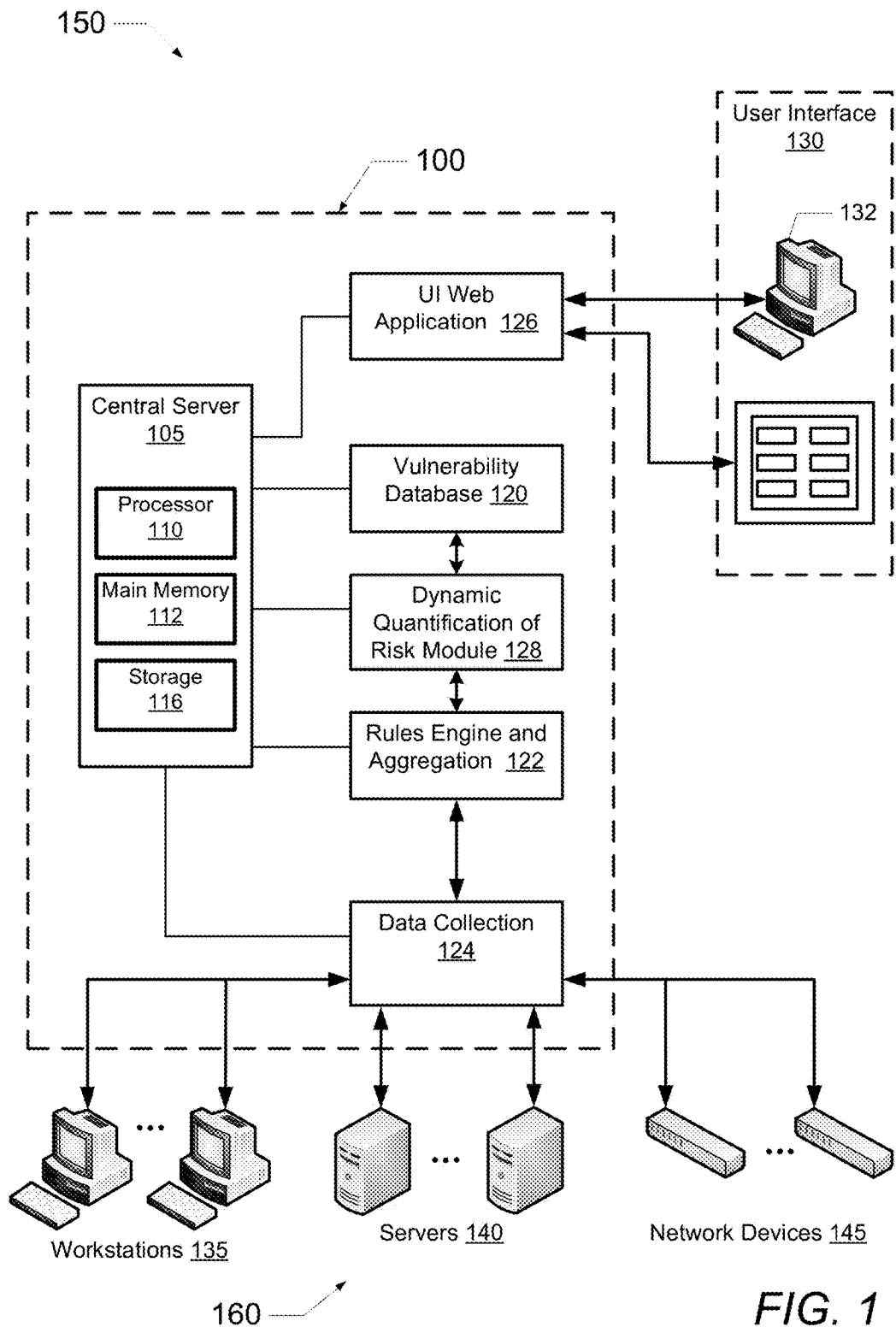
FIG. 1 is an example cyber-security risk analysis system integrated into an industrial control systems (ICS), according to an example embodiment.

Disclosed embodiments are described with reference to the attached figures, wherein like reference numerals, are used throughout the figures to designate similar or equivalent elements. The figures are not drawn to scale and they are provided merely to illustrate aspects disclosed herein. Several disclosed aspects are described below with reference to example applications for illustration. It should be understood that numerous specific details, relationships, and methods are set forth to provide a full understanding of the embodiments disclosed herein.

One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. Disclosed embodiments are not limited by the illustrated ordering of acts or events, as some acts may occur in different orders and/or concurrently with other acts or events. Furthermore, not all illustrated acts or events are required to implement a methodology in accordance with this Disclosure.

FIG. 1 is an example cyber-security risk analysis system (system) 100 integrated into a network of a control system 150 including a plurality of networked devices 160, according to an example embodiment. System 100 includes a central server 105 shown including a processor 110 and a main memory 112 and a storage device 116. Main memory 112 and storage device 116 store disclosed algorithms and database data. In one embodiment, storage device 116 can store vulnerability database 120, rules engine and aggregation module 122, data collection module 124, dynamic quantification of risk (DQR) program or module or algorithm 128 and user interface (UI) Web application module 126. Using disclosed algorithms, processor 110 is shown implementing vulnerability database 120, rules engine and aggregation module 122, data collection module 124, dynamic quantification of risk (DQR) program or module 128 and user UI Web application module 126.

Central server 105 is in communication with networked devices 160. The network implemented by control system 150 can be wired (e.g., cable), wireless, optical or any combination of the three (e.g., wired and wireless). Networked devices 160 include workstations 135, servers 140 and field devices 145. The data collection module 124 can be implemented using a local agent on each monitored device in the network implemented by the control system 150 including workstations 135, servers 140 and field devices 145, where the local agent collects data and sends the data to data collection module 124, such as using agentless collection protocols on each device (e.g., WINDOWS Management Instrumentation (WMI), Simple Network Management Protocol (SNMP), Syslog), or a combination of these two approaches. One particular implementation uses Microsoft System Center Operations Manager (SCOM) for data collection. System 100 can thus use a combination of local agents to collect data from workstations 135 (or PCs) and agentless collection to gather data from switches, routers, firewalls and intrusion detection/prevention devices. The raw data can be stored by data collection module 124 in a short-term database (e.g., 7 days of data) and a long term data warehouse (e.g., 12 months of data (or more if configured)). The data can either be collected periodically (polling) the monitored networked devices or when a change or event on any monitored device in the control system 150 is detected.

The rules engine and aggregation module 122 can be implemented with a custom developed rules engine which reads data from data collection module 124 embodies as a SCOM database and translates it into normalized data and groupings. Rules engine and aggregation module 122 is capable of receiving asynchronous notifications from SCOM when events occur and processing them essentially immediately. The rules engine and aggregation module 122 loads the resulting information into the vulnerability database 120 in storage device 116.

The vulnerability database 120 can be implemented as a MICROSOFT Structured Query Language (SQL) database with a custom schema. Vulnerability information and events are loaded into vulnerability database 120 by the rules engine and aggregation module 122 and are consumed by the user interface (UI) 130, such as through the UI web application 126 shown.

The UI web application 126 can be implemented as a web application accessed through a browser in the control system 150. The browser 133 can be located on a personal computer (PC) 132 or other device (e.g., tablet) with permissions to access the UI web application 126. UI web application 126 can be hosted in Microsoft Internet Information Services (IIS) and use SignalR and JSON for real-time notifications of updates to the vulnerability database 120 and knockout.js for dynamic webpage functionality. An alternative embodiment of UI web application 126 is a standalone application instead of a browser-based application. This application would access the vulnerability database 120 directly, without the need for UI web application 126, (subject to the security on that database) and use the information to drive the interface.

The data collection module 124 can scan networked devices 160 for known vulnerabilities (e.g., out-of-date WINDOWS patches) to collect vulnerability data that is loaded into the vulnerability database 120. The data collection module 124 can monitor the networked devices essentially "continuously" (e.g., every few seconds) for events with security implications (e.g., virus detection, WINDOWS authentication failures). Two different example methods for monitoring networked devices can be used. The simplest monitoring method is polling, where the value is read at some fixed interval (e.g., once every hour). The other method which can be used when possible is to register with the operating system of the device to be notified any time the value one is interested in changes. This method is generally only possible for certain parameters on certain operating devices (e.g., registry values on WINDOWS machines). When it is not possible to register for notifications for a given parameter, polling is generally used. Areas of monitoring include antivirus, application whitelisting, WINDOWS security events, network security (including state of switches, routers, firewalls, and intrusion detection/prevention systems), backup status, patching status and asset policies.

The DQR module 128 dynamically quantifies cyber-security risks accounting for inter-device dependences between networked devices 160 and in relation to observed behaviors across control system 150. For example, the behavior of field devices 145 and workstations 135 may also impact the overall cyber-security risks of servers 140. The dynamic quantification of risk in relation to observed behaviors is based upon the concept of device dependencies, which can either be defined by zones of network and computing devices, or specific device dependencies.

Figure 2:
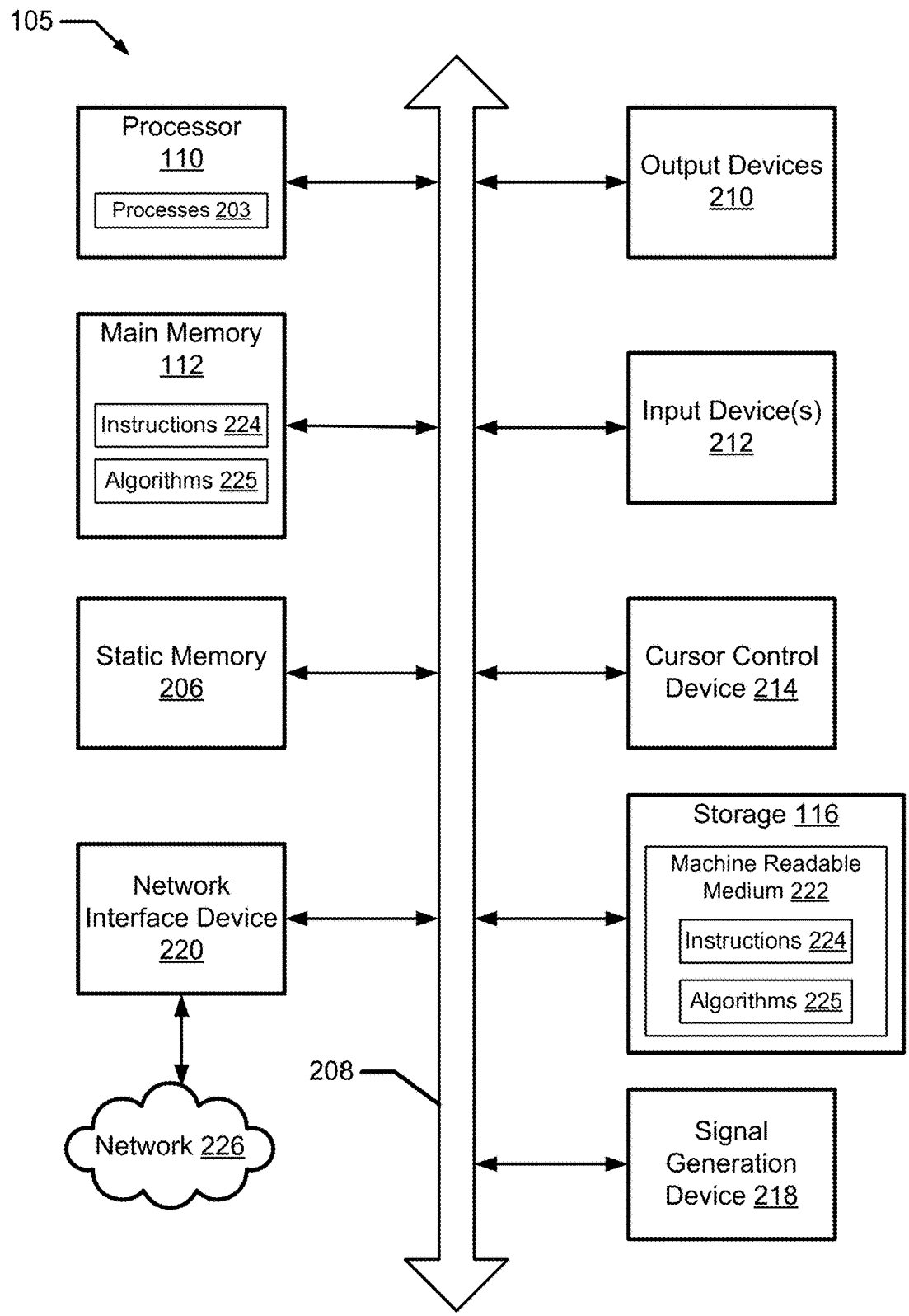
FIG. 2 is a block diagram of a central server, according to an example embodiment.

FIG. 2 illustrates an example block diagram of central server 105 within which a set of instructions 224 and/or algorithms 225 can be executed causing the central server 105 to perform any one or more of the methods, processes, operations, applications, or methodologies discussed herein. Central server 105 includes one or more processors 110 such as a central processing unit (CPU), a main memory 112 and a static memory 206, which communicate with each other via a system bus 208 which can represent a data bus and an address bus.

Processor 110 can run or execute one or more processes 203. Main memory 112 can store instructions 224 and/or algorithms 225 for execution by processor 110. Central server 105 further includes output devices 210 (e.g., a video display) and a signal generation device 218 (e.g., a speaker) which are connected to system bus 208. Central server 105 also has input devices such as an alphanumeric input device 212 (e.g., a keyboard) and a cursor control device 214 (e.g., a mouse) that are connected to system bus 208. A network interface device 220 is shown connected to an external communication network 226 to enable communication with the system bus 208.

A storage device 116 such as a hard drive or solid state drive is connected to and is in communication with system bus 208. The storage device 116 includes a machine-readable medium 222 on which is stored one or more sets of software such as instructions 224 and/or algorithms 225 embodying any one or more of the methodologies or functions described herein. The instructions 224 and/or algorithms 225 can also reside, completely or at least partially, within the main memory 112 and/or within the processor 110 during execution thereof by the central server 105. The main memory 112 and the processor 110 also contain machine-readable media. The instructions 224 and/or algorithms 225 can further be transmitted or received over network 226 via the network interface device 220.

While the machine-readable medium 222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the computer system and that cause the computer system to perform any one or more of the methodologies shown in the various embodiments of the present invention. The term "machine-readable medium" shall accordingly be taken to include, but not be limited to, solid-state memories, optical and magnetic media, and carrier wave signals.

Figure 3:
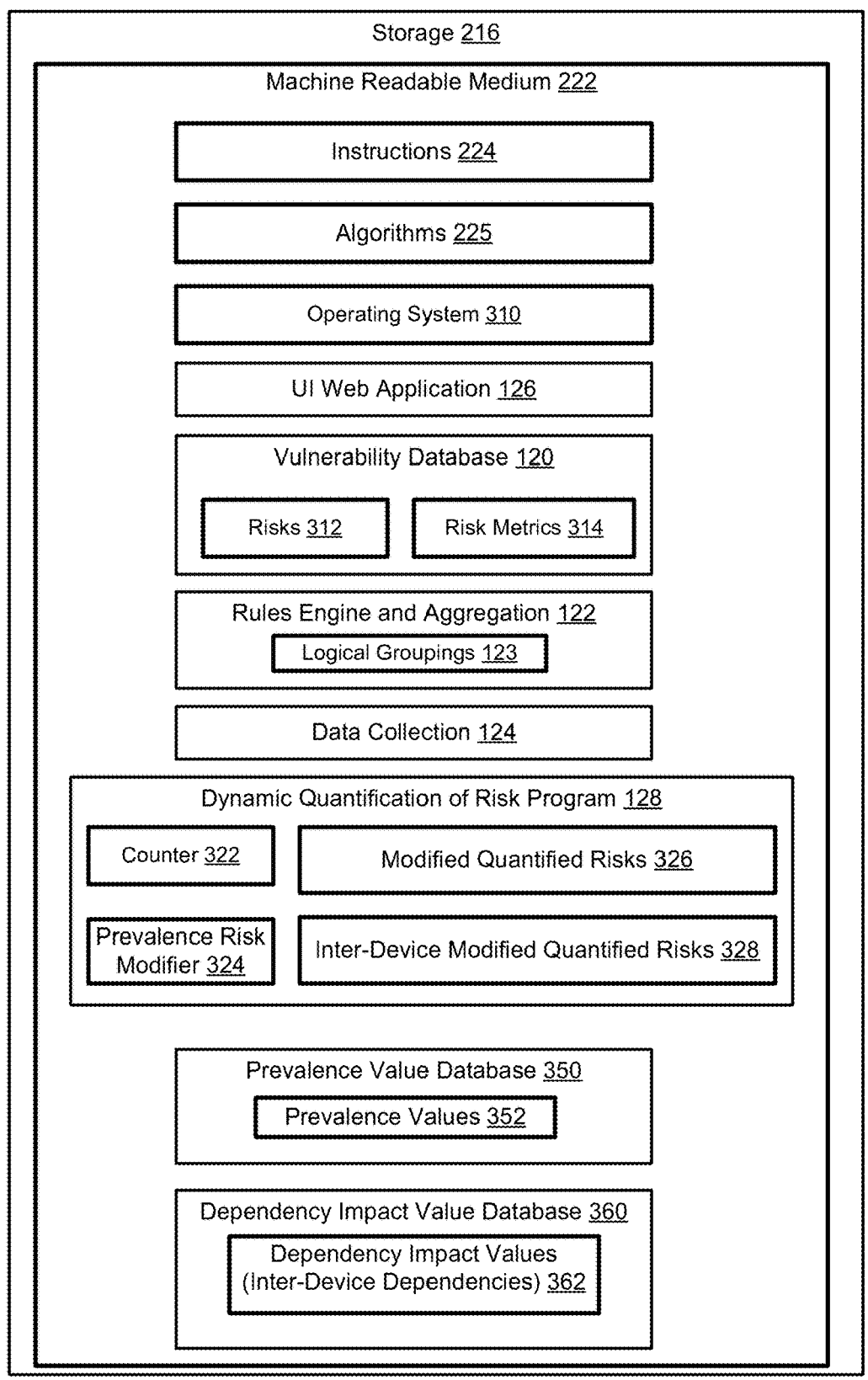
FIG. 3 is an example illustration of contents of a computer readable storage medium stored on a storage device, according to an example embodiment.

With reference to FIG. 3, example contents of machine-readable medium 222 stored within storage device 116 are shown. Machine-readable medium 222 can store instructions 224 and/or algorithms 225 for execution by processor 110. An operating system (O/S) 310 is also stored in machine-readable medium 222. O/S 310 manages resources and provides common services for central server 105.

Machine-readable medium 222 further includes vulnerability database 120, rules engine and aggregation module 122, data collection module 124, DQR program or module 128 and UI web application module 126. Vulnerability database 120 contains individual cyber-security risks 312 and risk metrics 314. Individual cyber-security risks 312 are risks that have been observed during the operation of control system 150. Risk metrics 314 are numerical values that are mapped to the level of risk associated with each individual cyber-security risk 312. Using an internal set of rules, a numeric score can be assigned to each risk to quantify the various risks and determine risk metrics 314. A simple example would be giving a simple score for each possible risk to the network devices, such as having the respective risks assigned a numeric value from 0 to 100 (e.g., 0 is no risk, and 100 is the highest possible risk).

The rules engine and aggregation module 122 can be implemented to read data from data collection module 124 and translates it into normalized data and logical groupings 123. The data collection module 124 can scan networked devices 160 for known vulnerabilities and collect individual cyber-security risks 312 and risk metrics 314 (vulnerability data) that is loaded into the vulnerability database 120.

The DQR module 128 is a software program that dynamically quantifies cyber-security risks accounting for inter-device dependences between networked devices 160 and in relation to observed behaviors (individual cyber-security risks 312) across control system 150. DQR module 128 includes a counter 322 that tracks the frequency of occurrence (prevalence) of cyber-security risks 312. When a new occurrence of an individual cyber-security risk is observed, counter 322 is incremented. When an occurrence of an individual cyber-security risk 312 is resolved, counter 322 is decremented. DQR module 128 also includes a prevalence risk modifier 324, individual modified quantified risks 326 and inter-device modified quantified risks 328.

Machine-readable medium 222 further includes a prevalence value data base 350 that stores prevalence values 352. Prevalence values 352 indicate both the number of networked devices where the cyber-security risk 312 is observed, as well as the frequency of the cyber-security risk (i.e., it happens across ten monitored networked devices, and/or it happens several times in a row on a single device). In one embodiment prevalence values 352 are calculated or generated by data collection module 124 and stored to storage device 216. The prevalence value decreases over time, if occurrences of the cyber-security risk 312 diminish in order to accurately reflect the prevalence of that risk.

For each individual cyber-security risk 312, the number of times it has occurred, as tracked by counter 322, is multiplied by the corresponding prevalence value in order to generate prevalence risk modifier 324. The prevalence risk modifier 324 is used to alter the existing risk metrics 314 for all instances of each individual cyber-security risk 312 in order to generate modified quantified risks 326. In an example embodiment, one individual cyber-security risk 312 is that the privileges of a user account on a workstation 135 are modified to enable administrator access. On its own, this could be a case of privilege escalation (a phase in many cyber attacks), or it could be a legitimate change. If another user's privileges are escalated on another workstation 135 at approximately the same time, the probability of a cyber attack increases while the probability of a legitimate change decreases. With each new occurrence of the individual cyber-security risk 312, the risk becomes more suspicious and is more likely to be malevolent in nature; therefore the prevalence risk modifier 324 is calculated to increase the modified quantified risk 326 for all occurrences of this individual cyber-security risk 312.

Machine-readable medium 222 further stores dependency impact value database 360 that contains inter-device dependencies (dependency impact values 362). The dependency impact values 362 indicate that a specific individual cyber-security risk 312 directly impacts the severity or importance of other individual cyber-security risks 312. When an individual cyber-security risk 312 is observed, a lookup to dependency impact value database 360 occurs to determine if there is a dependency impact value 362 associated with that individual cyber-security risk 312 as well as a list of impacted network devices 160 and any conditional logic required to determine the impact of the individual cyber-security risks 312. The dependency impact value 362 is added to the modified quantified risk 326 of all risk metrics 314 of impacted network devices in order to generate inter-device modified quantified risk (total risk) 328.

In one example, WINDOWS security auditing is disabled on a server where it was running previously. This is very likely the malicious result of malware or unauthorized use, indicating a high probability that the system being observed has been compromised. Because of this, all individual cyber-security risks 312 should be scrutinized more heavily, and treated more suspiciously. When such an event is observed, a lookup to dependency impact value database 360 occurs to determine if there is a dependency impact value 362 associated with WINDOWS security auditing being disabled. This dependency impact value 362 is added to the modified quantified risk 326 of all risk metrics 314 of impacted network devices in order to generate inter-device modified quantified risk (total risk) 328.

In another example, the antivirus software on one workstation has detected and quarantined a virus. Upon observation of this cyber-security risk 312, a dependency impact value 362 is retrieved with conditional logic associated with it that instructs DQR algorithm 128 to increase the risk metrics 314 of all networked devices 160 that are not protected by Anti-virus software, or that have Anti-virus malware definition files that are older than those used to detect the virus (using either internal logic and data, or calls to a $3^{rd}$ party system such as a vulnerability management system). While a virus is high-risk, a blocked virus is low-risk, so only the risk metrics 314 of vulnerable systems are modified to reflect the higher risk.

The dependency impact values 362 can be defined across all of the networked devices 160 (e.g., an increase in network risk may impact all devices within that network), or a subset of networked devices 160 based upon criteria such as: device type; user account; a specific patch level; or almost any known data point that describes the risk target. This requires that a lookup be performed when processing any new occurrence of observed cyber-security risk 312 that possesses a dependency impact value 362 or prevalence value 352, so that the dependency or prevalence values are applied only to the measured risk metrics 314 of those dependent networked devices.

Figure 4A:
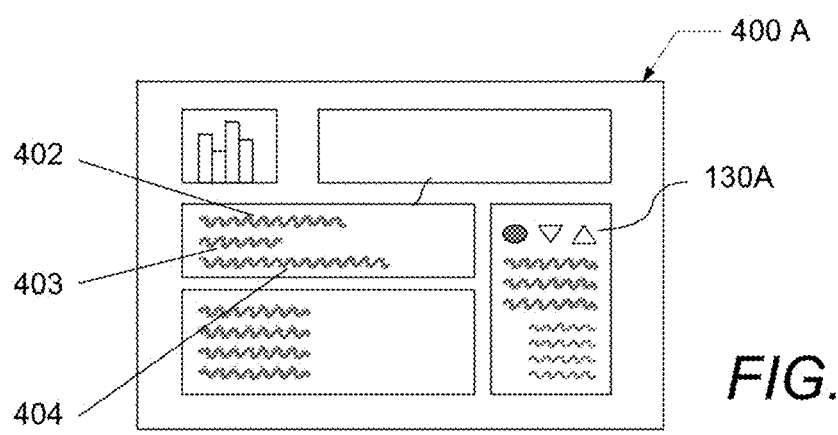
FIG. 4A illustrates a depiction of security risk without dynamic quantification of risk in relation to observed behaviors, according to an example embodiment.
Figure 4B:
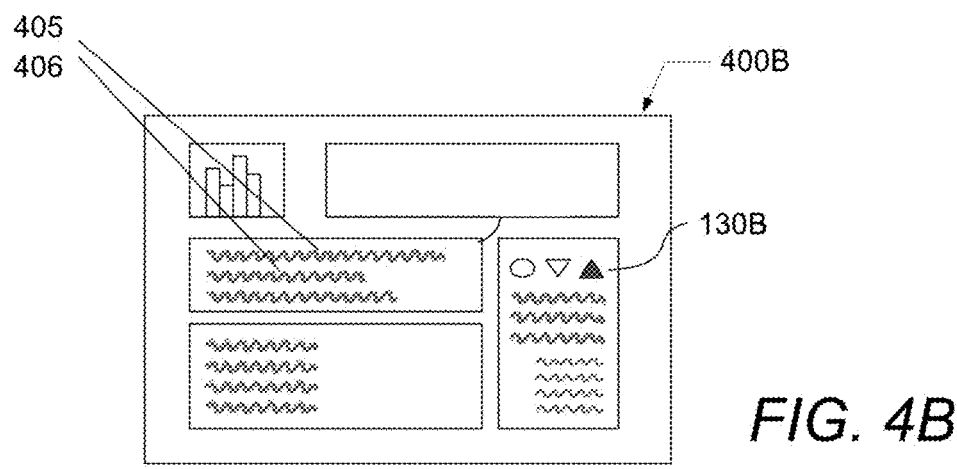
FIG. 4B illustrates a depiction of security risk with dynamic quantification of risk in relation to observed behaviors, according to an example embodiment.

Turning to FIGS. 4A and 4B, additional disclosure is now provided regarding dynamic quantification of security risk in relation to observed behaviors across device networks. As described above, security risk utilized by a disclosed rules engine and aggregation module 122 impacts the UI 130 to more accurately represent the risks associated with networked devices that are inter-dependent, based upon observed behaviors. As shown in FIG. 4A, depiction 400A without dynamic quantification of security risk in relation to observed behaviors illustrates a UI 130A where the rules engine 122 calculates a security risk metric for a list of networked devices (device 1 metric 402, device 2 metric 403 and device 3 metric 404) and displays these via UI 130A which also identifies alert levels. Risks associated with the networked devices are all independent, and are not changed based upon observed behaviors.

In contrast, with disclosed dynamic quantification of security risk in relation to observed behaviors as shown in FIG. 4B, the behavior of device 3 may impact the overall risk of networked devices 1 and 2. This is represented in depiction 400B as UI 130B. New risk metrics for device 1 metric 405 and device 2 metric 406 have been generated in view of the interdependency of device 3. In one embodiment, the use of dynamic quantification of security risk in relation to observed behaviors can change a minor alert into a major alert.

Figure 4C:
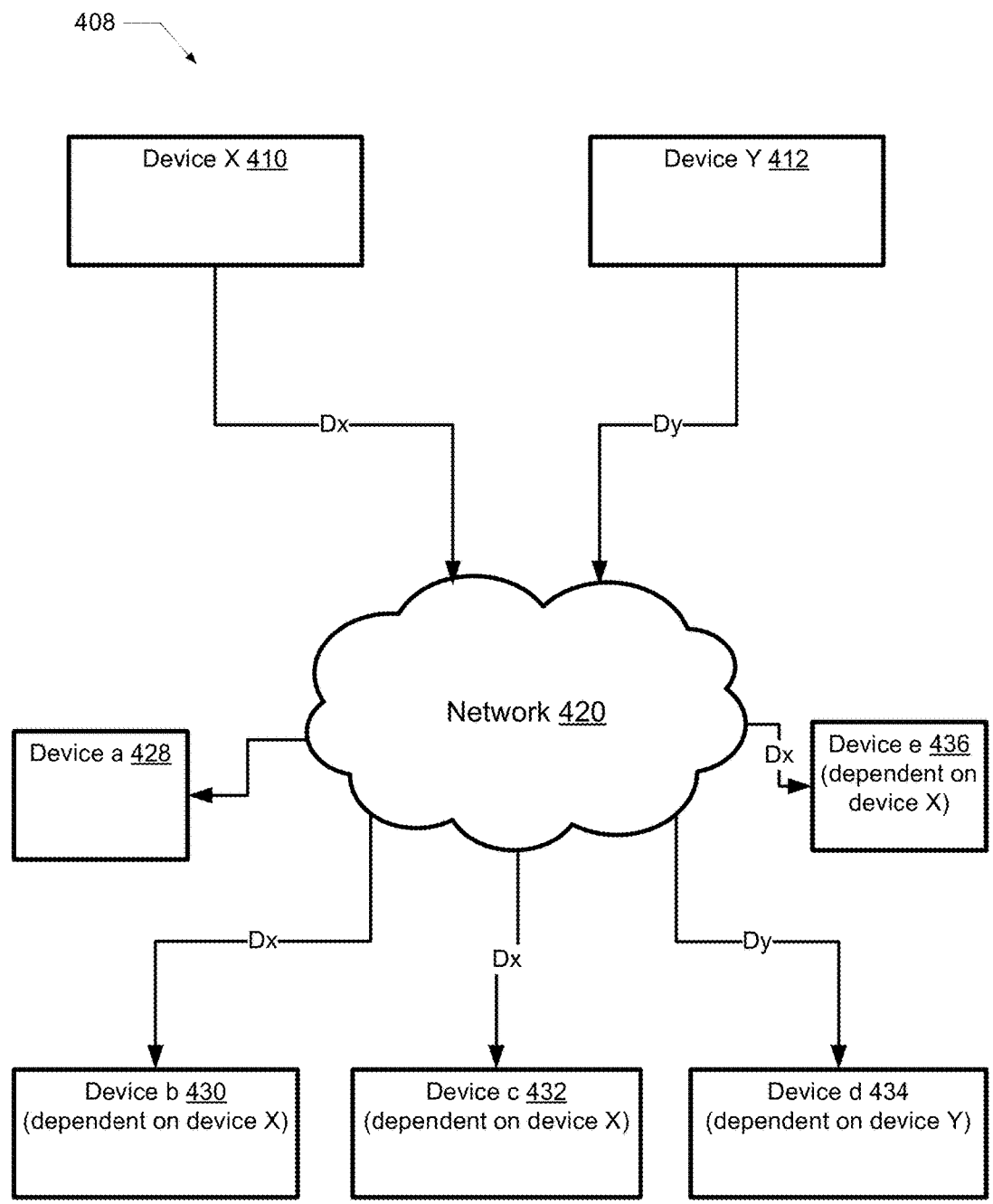
FIG. 4C illustrates a concept map of inter-device dependencies, according to an example embodiment.

The dynamic quantification of risk in relation to observed behaviors is based upon the concept of device dependencies, which can either be defined by a zone comprising all networked devices, or specific device dependencies. FIG. 4C illustrates a concept map of inter-device dependencies (dependency impact values 362) as applied to multiple networked devices interconnected by network 420 within a single zone 408. Device a 428 is not dependent on any other device. Device b 430, device c 432 and device e 436 are dependent upon Device X 410. Any risk to Device X 410 would also put corresponding subordinate dependent devices (e.g. devices 430, 432 and 436) at risk. The risk Dx is shown propagating to devices 430, 432 and 436. Device d 434 is dependent upon device Y 412. Any risk to Device Y 412 would also put dependent device d 434 at risk. The risk to device d 434 would be adjusted by Dy. Dx and Dy are dependency impact values 362 and are stored in dependency impact value database 360 and integrated into rules engine and aggregation module 122. The risk to device d 434 illustrates how dependencies can be complex and tiered.

Figure 4D:
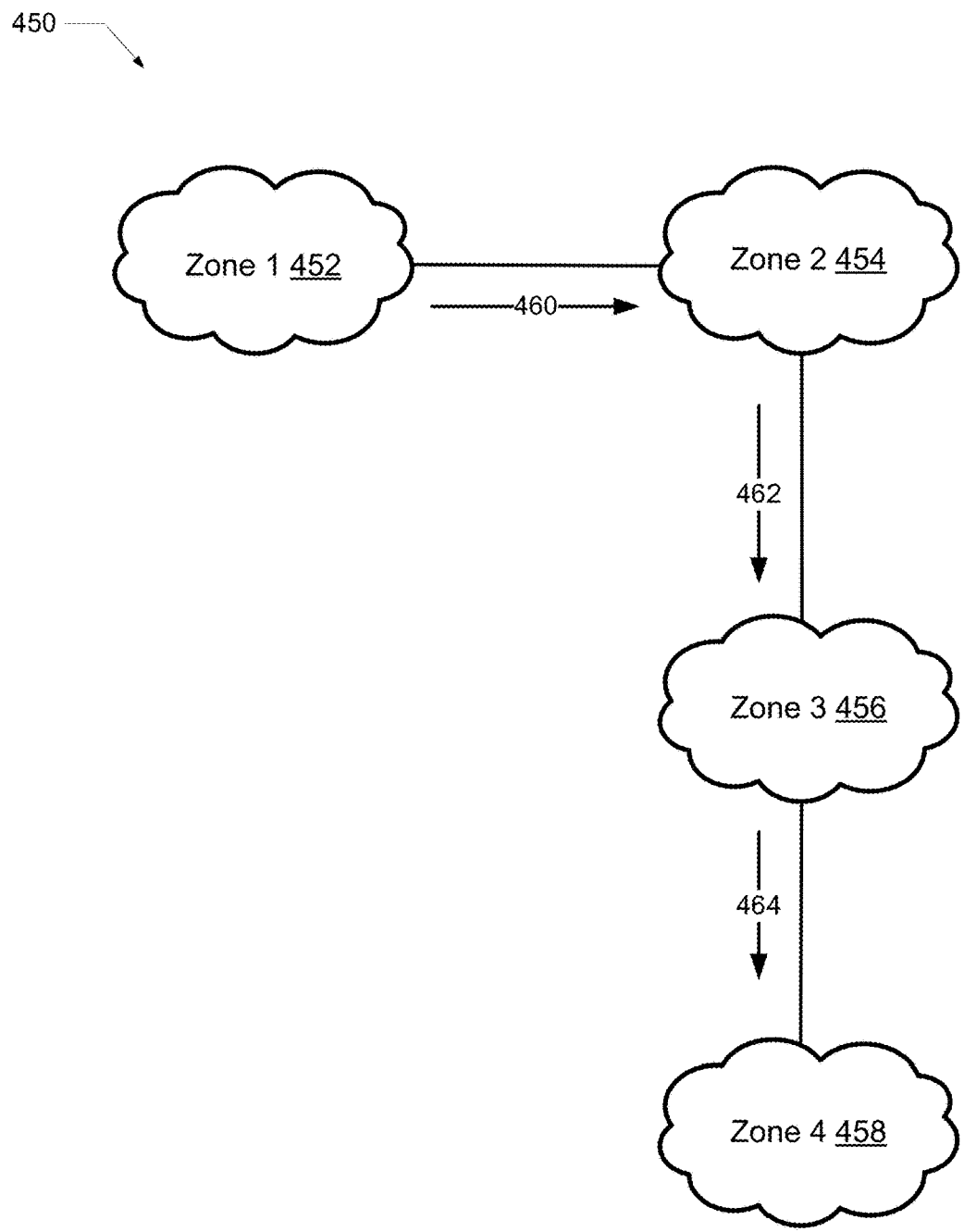
FIG. 4D illustrates how risk items in one zone can influence the risk of other zones, according to an example embodiment.

The dynamic quantification of risk in relation to observed behaviors can also be dynamically adjusted between several zones as well, based upon interconnectivity and other factors. Referring to FIG. 4D, a depiction 450 of several zones in a network is shown. Risk items in Zone 1 452 can influence or cascade as risk 460 to Zone 2 454. Zone 2 454 is also connected to Zone 3 456, so additional influence or risk 462 can also cascade, perhaps to a lesser degree and so on for additional connected zones. Risk items in Zone 3 456 can influence or cascade as risk 464 to Zone 4 458.

Figure 5:
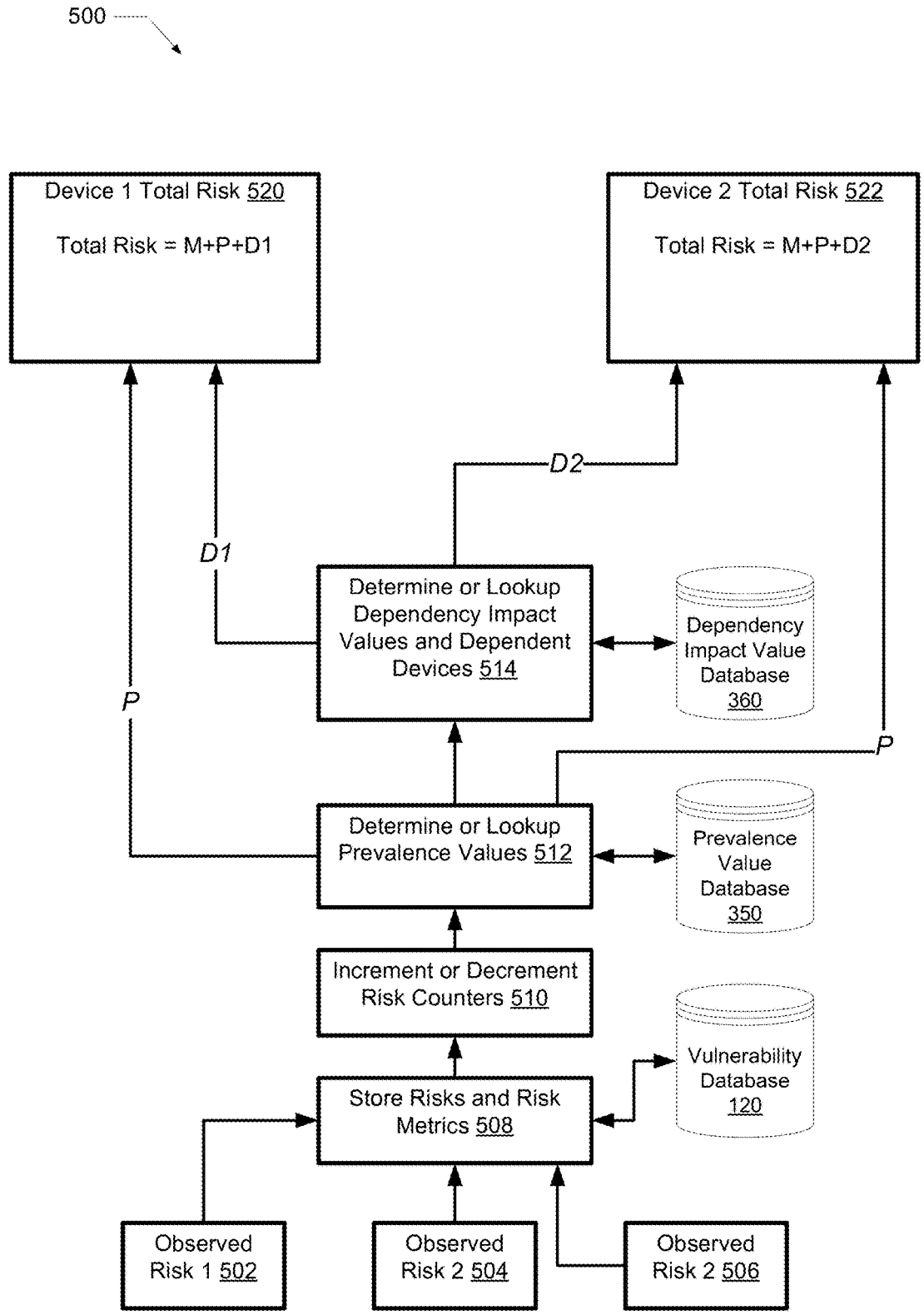
FIG. 5 provides a depiction of dynamic quantification of cyber-security risks in relation to observed behaviors, according to an example embodiment.

FIG. 5 provides a depiction of a method 500 of dynamic quantification of cyber-security risks in relation to observed behaviors. Method 500 begins with the observation of one or more individual cyber-security risks 312 such as observed risk 1 502, risk 2 504 and risk 2 506. Risks 502-506 can be observed during the operation of data collection module 124. In one embodiment, risks 502-506 can be the collection of a static data point (a firewall is enabled or disabled), a device generated event (antivirus software has quarantined a firewall) and a collected value (number of dropped packets from a network switch, or the length of a password). In FIG. 5, two duplicate risk 2 (504 and 506) have been observed, with each labeled as a separate observed risk.

When an occurrence of risks 502-506 is observed, it is stored to vulnerability database 120 (along with associated risk metrics 314 (M)) at block 508. When an occurrence of risks 502-506 is observed, counter 322 is incremented (block 510). When an occurrence of an individual cyber-security risk 312 is resolved, counter 322 is decremented (block 510). Also when an occurrence of an individual cyber-security risk 312 is observed, prevalence values (P) 352 associated with the individual cyber-security risk 312 are determined or looked up from prevalence value database 350 (block 512). The prevalence value 352 indicates whether the cyber-security risk 312 is more important when it occurs in greater quantity or higher frequency. Also, when an occurrence of an individual cyber-security risk 312 is observed, dependency impact values (D1, D2) 362 associated with the individual cyber-security risk 312 and impacted networked devices are determined or looked up from dependency impact database 360 (block 514). The dependency impact value 362 indicates whether the observed cyber-security risk 312 impacts any or all other cyber security risks 312.

In one embodiment, prevalence value 352 and dependency impact value 362 are pre-determined and stored in databases 350 and 360, respectively. In another embodiment, processor 110, executing DQR program 128 calculates new prevalence values 352 and dependency impact values 362 or modifies the prevalence values 352 (block 512) and dependency impact values 362 (block 514) stored in databases 350 and 360 based on the observed cyber-security risks 312 and associated risk metrics 314.

The total cyber-security risk of device 1 is calculated at block 520. The total risk for device 1 is the sum of the risk metrics 314 (M), the prevalence values (P) 352 and the dependency impact values (D1) 362 for all of the individual cyber-security risks 312 associated with device 1. The total cyber-security risk of device 2 is calculated at block 522. The total risk for device 2 is the sum of the risk metrics 314 (M), the prevalence values (P) 352 and the dependency impact values (D2) 362 for all of the individual cyber-security risks 312 associated with device 2.

Figure 6:
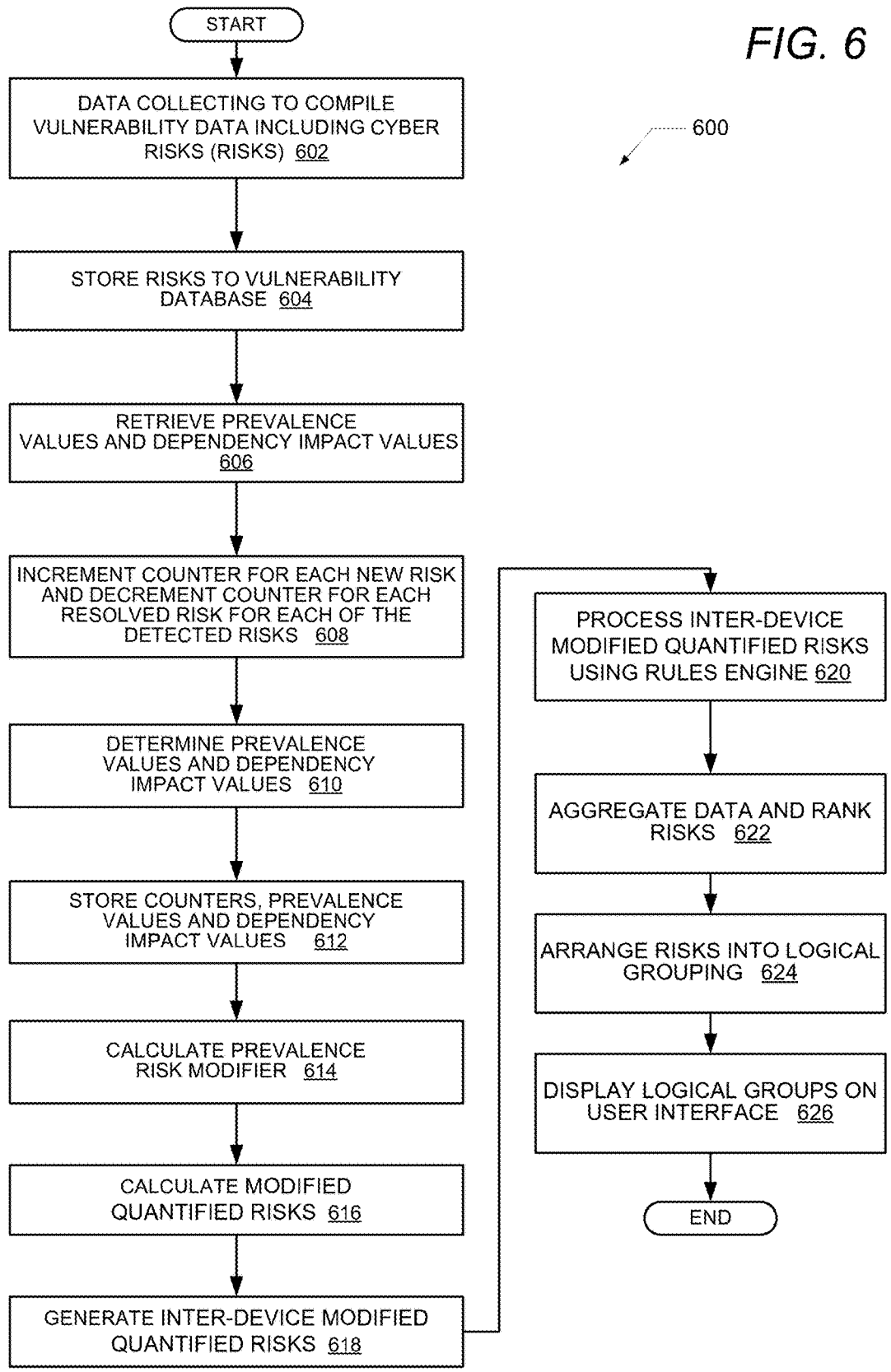
FIG. 6 is a flow chart that shows steps in an example method of dynamically quantifying cyber-security risks in a control system and analyzing the risks, according to an example embodiment.

Referring to FIG. 6, a flow chart showing steps in an exemplary method 600 for dynamically quantifying cyber-security risks in control system 150 is shown. With reference to FIGS. 1-6, method 600 can be implemented via the execution of instructions 224 and/or algorithms 225 by processor 110 within the central server 105 and specifically by the execution of DQR program 128 by processor 110.

Method 600 begins at the start block and proceeds to block 602. At block 602, processor 110 collects data via data collection module 124. Data collection module scans networked devices 160 for known vulnerabilities and collects individual cyber-security risks 312 and risk metrics 314 (vulnerability data) that is stored into the vulnerability database 120 (block 604). Processor 110 retrieves prevalence values 352 from prevalence value database 350 and the dependency impact values 362 from dependency impact value database 360 from storage device 216 (block 606). Processor 110 increments risk counters 322 for each of the individual cyber-security risks 312 when a new occurrence of the quantified individual cyber risk is observed or decrements risk counters 322 for each of the individual cyber-security risks 312 when a quantified individual cyber risk is resolved (block 608).

Processor 110 determines new prevalence values 352 for the cyber-security risks 312 based on the retrieved prevalence values 352 and any observed new occurrences of the cyber-security risks 312 (block 610). Processor 110 determines new dependency impact values 362 for the cyber-security risks 312 based on the retrieved dependency impact values 362 and the inter-dependencies of networked devices 160 within control system 150 (block 610). Processor 110 stores the risk counters 322 to storage device 216, stores the new prevalence values 352 to prevalence value database 350 and stores new dependency impact values 362 to dependency impact value database 360 at block 612.

Processor 110 calculates a prevalence risk modifier 324 for the quantified individual cyber-security risks 312 based on the prevalence value 352 and risk counter 322 (block 614). For each individual cyber-security risk 312, the number of times it has occurred, as tracked by counter 322, is multiplied by the corresponding prevalence value 352 in order to generate prevalence risk modifier 324. Processor 110 calculates or generates at least one individual modified quantified risk 326 based on the prevalence risk modifier 324 and one of the risk metrics 314 corresponding to the quantified individual cyber-security risk 312 (block 616). The prevalence risk modifier 324 is added to the existing risk metrics 314 for all instances of each individual cyber-security risk 312 in order to generate individual modified quantified risks 326.

At block 618, processor 110 calculates or generates inter-device modified quantified risks (total risk) 328. Inter-device modified quantified risks 328 are calculated by adding the dependency impact value 362 to the individual modified quantified risk 326 of all risk metrics 314 of impacted network devices. The inter-device dependencies 362 for a first of the networked devices 160 and the quantified individual cyber-security risk 312 and risk metric 314 for at least one other of the networked devices 160, reflecting the individual modified quantified risk 326 are used to dynamically modify the quantified individual risk for the first device to generate an inter-device modified quantified risk 328. The inter-device modified quantified risks (total risk) 328 provide a measure of the total risk to control system 150 due to cyber-security risks 312.

Processor 110 processes the inter-device modified quantified risks 328 for all of the cyber-security risks 312 and network devices 160 using rules engine and aggregation module 122 (block 620). Processor 110 aggregates the data from the operation of block 620 including ranking the inter-device modified quantified individual risks 328 across the networked devices (block 622) and arranges the inter-device modified quantified individual risks 328 into at least one logical grouping 123 (block 624). The results from the rules engine and aggregation module 122 processing are sent to the UI 130 where the logical groupings 123 are displayed to a user (block 626). Method 600 then ends.

While various disclosed embodiments have been described above, it should be understood that they have been presented by way of example only, and not as a limitation. Numerous changes to the disclosed embodiments can be made in accordance with the Disclosure herein without departing from the spirit or scope of this Disclosure. Thus, the breadth and scope of this Disclosure should not be limited by any of the above-described embodiments. Rather, the scope of this Disclosure should be defined in accordance with the following claims and their equivalents.

The invention claimed is:

1. A method of quantifying cyber-security risks in a control system including a plurality of networked devices in a network, comprising:
providing a processor and a memory device storing inter-device dependencies based on an interconnectivity between said plurality of network devices, wherein said control system is an industrial control system and said plurality of networked devices include controllers and field devices, a database that includes quantified individual cyber risks (individual risks) for each of said plurality of networked devices, and a dynamic quantification of risk (DQR) algorithm, said processor running said DQR algorithm and implementing:
receiving observed cyber behavior comprising cyber-security risk items for said plurality of networked devices during operation of said network;
responsive to said observed cyber behavior, updating said database by modifying at least one of said individual risks to provide a modified individual risk, and
generating, dynamically, a total cyber risk for said first device using said inter-device dependencies for a first of said plurality of networked devices (first device) and said modified individual risk, the step of dynamically generating the total cyber risk for said first device comprises:
retrieving a prevalence value database that stores prevalence values which indicate both a number of said plurality of networked devices where each of said cyber-security risk items is observed, as well as a frequency of said cyber-security risk items from said memory device;
determining a prevalence value for said individual risks based on said prevalence value database;
calculating a prevalence risk modifier for said individual risks based on said prevalence value;
generating said modified individual risk based on said prevalence risk modifier and one of said individual risks; and
displaying said modified individual risk on a user interface.

2. The method of claim 1, further comprising:
incrementing a first risk counter when a new risk occurrence of one of said cyber-security risk items is observed.

3. The method of claim 2, wherein a first prevalence value for said new risk occurrence is calculated based at least partially on said first risk counter.

4. The method of claim 1, further comprising:
processing data in said database using a rules engine and said total cyber risk for said plurality of networked devices;
aggregating data including ranking said total cyber risks across said plurality of networked devices and arranging said plurality of networked devices into a plurality of zones based on cyber dependencies of said plurality of networked devices; and
displaying a depiction of a selected one of said plurality of zones on a user interface.

5. A cyber-security risk analysis system for analyzing cyber-security risks in a control system including a plurality of networked devices, comprising:
a central server having a processor and a memory device in communication with said processor, said memory device storing inter-device dependencies based on an interconnectivity between said plurality of networked devices, wherein said control system is an industrial control system and said plurality of networked devices include controllers and field devices, a database that includes quantified individual cyber risks (individual risks) for each of said plurality of networked devices, and a dynamic quantification of risk (DQR) program, said central server programmed to implement said DQR program, wherein said central server:
receives observed cyber behavior comprising cyber-security risk items for said plurality of networked devices during operation of said network;
responsive to said observed cyber behavior, updating said database by modifying at least one of said individual risks to provide a modified individual risk, and
generates, dynamically, a total cyber risk for said first device using said inter-device dependencies for a first of said plurality of networked devices (first device) and said modified individual risk, the step of dynamically generating the total cyber risk for said first device comprises:
retrieve a prevalence value database that stores prevalence values which indicate both a number of said plurality of networked devices where each of said cyber-security risk items is observed, as well as a frequency of said cyber-security risk items from said memory device;
determine a prevalence value for said individual risks based on said prevalence value database;
calculate a prevalence risk modifier for said individual risks based on said prevalence value;
generate said modified individual risk based on said prevalence risk modifier and one of said individual risks; and
displaying said modified individual risk on a user interface.

6. The system of claim 5, wherein said DQR program further causes said central server to:
increment a first risk counter when a new risk occurrence of one of said cyber-security risk items is observed.

7. The system of claim 6, wherein a first prevalence value for said new risk occurrence is calculated based at least partially on said first risk counter.

8. The system of claim 5, wherein said central server further:
processes data in said database using a rules engine and said total cyber risks for said plurality of networked devices;
aggregates data including ranking said total cyber risks across said plurality of networked devices and arranging said plurality of networked devices into a plurality of zones based on cyber dependencies of said plurality of networked devices; and
displays a depiction of a selected one of said plurality of zones on a user interface.

9. A computer program product, comprising:
a memory device having a non-transitory data storage medium that includes program instructions executable by a processor to enable said processor to execute a method for analyzing cyber-security risks in a control system including a plurality of networked devices, wherein said control system is an industrial control system and said plurality of networked devices include controllers and field devices, said non-transitory data storage medium storing inter-device dependencies based on an interconnectivity between said plurality of networked devices, a database that includes quantified individual cyber risks (individual risks) for each of said plurality of networked devices, and a dynamic quantification of risk (DQR) algorithm, said computer program product comprising:

code for receiving observed cyber behavior comprising cyber-security risk items for said plurality of networked devices during operation of said network;

responsive to said observed cyber behavior, code for updating said database by modifying at least one of said individual risks to provide a modified individual risk, and generating, dynamically, a total cyber risk for said first device using said inter-device dependencies for a first of said plurality of networked devices (first device) and said modified individual risk, the step of code for dynamically generating total cyber risk for said first device comprises:

code for retrieving a prevalence value database that stores prevalence values which indicate both a number of said plurality of networked devices where each of said cyber-security risk items is observed, as well as a frequency of said cyber-security risk items from said memory device;

code for determining a prevalence value for said individual risks based on said prevalence value database;

code for calculating a prevalence risk modifier for said quantified individual risks based on said prevalence value; and code for generating said at least one modified individual risk based on said prevalence risk modifier and one of said individual risks;

whereby said modified individual risk is displayed on a user interface.

* * * * *